United States Patent [19]
Robertson et al.

[11] Patent Number: 5,339,390
[45] Date of Patent: Aug. 16, 1994

[54] OPERATING A PROCESSOR TO DISPLAY STRETCHED CONTINUATION OF A WORKSPACE

[75] Inventors: George G. Robertson; Jock Mackinlay, both of Palo Alto; Stuart K. Card, Los Altos Hills, all of Calif.

[73] Assignee: Xerox Corporation, Stamford, Conn.

[21] Appl. No.: 23,466

[22] Filed: Feb. 25, 1993

Related U.S. Application Data

[63] Continuation of Ser. No. 488,587, Mar. 5, 1990, abandoned.

[51] Int. Cl.$^5$ .............................................. G06F 15/62
[52] U.S. Cl. ..................................... 395/157; 395/161
[58] Field of Search ................................ 395/118–126, 395/127, 139, 155–161, 133; 340/721; 345/122–123, 119, 127, 131

[56] References Cited

U.S. PATENT DOCUMENTS

| | | | |
|---|---|---|---|
| 4,528,585 | 7/1985 | Bolger | 358/22 |
| 4,649,499 | 3/1987 | Sutton et al. | 395/156 X |
| 4,685,070 | 8/1987 | Flinchbaugh | 395/124 |
| 4,808,987 | 2/1989 | Takeda et al. | 340/721 |
| 4,858,149 | 8/1989 | Quarendon | 395/119 |
| 4,974,173 | 11/1990 | Stefik et al. | 395/159 X |
| 4,974,344 | 1/1991 | Jordan | 395/159 X |
| 4,982,344 | 1/1991 | Jordan | 395/159 X |
| 5,008,853 | 4/1991 | Bly et al. | 395/153 |
| 5,021,976 | 6/1991 | Wexelbat et al. | 395/159 |
| 5,072,412 | 12/1991 | Henderson, Jr. et al. | 395/159 |
| 5,103,217 | 4/1992 | Cawley | 395/129 |
| 5,107,443 | 4/1992 | Smith et al. | 395/158 |
| 5,146,555 | 9/1992 | Kiyohara | 395/157 |

FOREIGN PATENT DOCUMENTS

| | | | |
|---|---|---|---|
| 260144A2 | 9/1987 | European Pat. Off. | G06F 15/62 |
| 319232A | 6/1989 | European Pat. Off. | |
| 0353952 | 2/1990 | European Pat. Off. | |
| 2139846A | 3/1984 | United Kingdom | H04N 1/02 |

OTHER PUBLICATIONS

Dalton, R. "Beyond Bifcoals: Help for tired eyes," *Lotus*, vol. 4, No. 10, Oct. 1988, pp. 17–18.
inLarge brochure, Berkeley Systems, Inc., Berkeley, California.

(List continued on next page.)

*Primary Examiner*—Heather R. Herndon
*Assistant Examiner*—John E. Breene

[57] ABSTRACT

A processor presents a sequence of images of a workspace that is stretched to enable the user to view a part of the workspace in greater detail. The workspace includes a middle section and two peripheral sections that meet the middle section on opposite edges. Each of the sections appears to be a rectangular two-dimensional surface and they are perceptible in three dimensions. When the user is viewing the middle section as if it were parallel to the display screen surface, each peripheral section appears to extend away from the user at an angle from the edge of the middle section so that the peripheral sections occupy relatively little of the screen. When the user requests stretching, the middle section is stretched and the peripheral sections are compressed to accommodate the stretching. When the user requests destretching, the middle section is destretched and the peripheral sections are decompressed accordingly. The workspace includes display objects that may cross the edges from the middle section to the peripheral sections during stretching. Stretching and destretching are performed in small steps to preserve object constancy for display objects that cross the edges. The display objects can have fixed sizes, in which case each display object is perceived as being tacked to the workspace at a point. Or the display objects can stretch and destretch with the workspace, in which case additional internal detail may become visible as a result of stretching and each display object is perceived as being glued to the workspace over its entire extent. Additional display objects can become visible as a result of stretching.

22 Claims, 10 Drawing Sheets

OTHER PUBLICATIONS

Farrand, W. A., "Information Display in Interactive Design," Doctoral Thesis, University of California Los Angeles 1973.

European Search Report and Annex, Application No. EP91 30 1798.

Beier, T., and Neely, S., "Feature-Based Image Metamorphosis," *Computer Graphics*, 25, 2, Jul. 1992, pp. 35–42.

Wolberg, G., *Digital Image Warping*, IEEE Computer Society Press, Los Alamitos, California, 1990, pp. 1–10, 222–240, and 301–314.

Sederberg, T. W., and Parry, S. R., "Free-Form Deformation of Solid Geomtric Models," *Computer Graphics*, 20, 4, Aug. 1986, pp. 151–160.

Spence, R and Apperley, M., "Data Base Navigation: An Office Environment for the Professional," Behavior and Information Technology, vol. 1, No. 1, 1982, pp. 43–54.

Furnas, G. W., "Generalized Fisheye Views," CHI '86 Proceedings, ACM, Apr. 1986, pp. 16–23.

Fairchild, K. M., Poltrock, S. E., and Furnas, G. W., "SemNet: Three-Dimensional Graphic Representations of Large Knowledge Bases," in Guindon, R., Ed., Cognitive Science and its Application for Human Computer Interaction, Lawrence Erlbaum, Hillsdale, New Jersey, 1988, pp. 201–233.

MacPaint Manual, Apple Computer, Inc. pp. 1–11, 14–32.

Feiner, Steven et al., "An Experiment System for Creating and Presenting Interactive Graphical Documents," *ACM Transactions on Graphics*, vol. 1, No. 1, Jan. 1982, pp. 59–77.

Sutherland, I. E., "Sketchpad—A Man-Machine Graphical Communication System", AFIPS Spring Joint Computer Conference, vol. 23, (1963) pp. 329–346.

Bolt, R. A., *The Human Interface*, Lifetime Learning Publications, Belmont, California, 1984, pp. 8–34.

Herot, C. F., "Spatial Management of Data", *ACM Trans. on Database Systems*, vol. 5, No. 4 (Dec. 1980), pp. 493–514.

Wilson, Kathleen S., "Palenque: An Interactive Multimedia Optical Disc Prototype for Children", Center for Children and Technology, Bank Street College of Education, New York, Working Paper No. 2, Mar. 1987, pp. 1–8.

Nielsen, "The Art of Navigating through Hypertext", Mar. 1990, Com. of the ACM, pp. 297–310.

Parascandolo, Clip 3D, Aug. 1989, MacUser, p. 171(1).

OPERATING A PROCESSOR TO DISPLAY STRETCHED CONTINUATION OF A WORKSPACE

This is a continuation of application Ser. No. 07/488,587, filed Mar. 5, 1990, now abandoned.

BACKGROUND OF THE INVENTION

The present invention relates to techniques for display presentation of a workspace within which display features are perceived as having positions relative to each other.

Spence, R. and Apperley, M., "Data Base Navigation: An Office Environment for the Professional," *Behaviour and Information Technology*, Vol. 1, No. 1, 1982, pp. 43–54, describe bifocal viewing systems. As described in relation to FIG. 5(c), a surface on which icons are located, referred to as the wall, can be presented in three separate viewports; the central region presents a part of the wall in sufficient detail to permit the user to read its contents in full; two outer regions retain less detail. The user can scroll by touching an item in one of the outer regions and pulling it into the central region. In response, the whole strip of data is moved across the screen, preserving the spatial relationships between items. The representation of an item in the outer regions should not merely be a demagnified version of the central region representation, but rather a representation more appropriate to their lower resolution. As described in relation to FIGS. 6 and 7, scrolling can be in vertical and horizontal dimensions. As described in relation to FIGS. 8 and 9, zooming can provide additional levels of information.

In a video presentation made publicly available in 1983, Spence illustrated a bifocal display like that described in the article by Spence and Apperley. The video shows a column from a newspaper extending across the space between two pegs and, outside the pegs, extending backward at an angle away from the viewer, so that the part of the column between the pegs is legible while the parts outside the pegs are visible but illegible. The video also shows a strip of paper with colored rectangles attached to it, again with a fully visible part between the two pegs and the two parts outside the pegs extending backward at an angle so that the colored rectangles appear as narrow colored strips. Finally, the video shows a similar strip of paper in which the colored rectangle between the pegs includes text that is legible, while the colored rectangles on the parts that extend backward each have a single large character, resembling the features in FIG. 5(c) of the article by Spence and Apperley.

Furnas, G. W., "Generalized Fisheye Views," *CHI '86 Proceedings*, ACM, April 1986, pp. 16–23, describes fisheye views that provide a balance of local detail and global context. Section 1 discusses fisheye lenses that show places nearby in great detail while still showing the whole world, showing remote regions in successively less detail; a caricature is the poster of the "New Yorker's View of the United States." Section 3 describes a degree of interest (DOI) function that assigns, to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 for a tree structured text file. Section 4 also describes fisheye views for botanical taxonomies, legal codes, text outlines, a decisions tree, a telephone area code directory, a corporate directory, and UNIX file hierarchy listings. Section 5 indicates that a display-relevant notion of a priori importance can be defined for lists, trees, acyclic directed graphs, general graphs, and Euclidean spaces; unlike the geographic example which inspired the metaphor of the "New Yorker's View," the underlying structures need not be spatial, nor need the output be graphic. FIG. 6 shows a fisheye calendar.

Fairchild, K. M., Poltrock, S. E., and Furnas, G. W., "SemNet: Three-Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233, describe SemNet, a three-dimensional graphical interface. SemNet presents views that allow users to examine local detail while maintaining a global representation of the rest of the knowledge base. As shown and described in relation to FIG. 1-1, SemNet represents a knowledge base as a directed graph in a three-dimensional space, with elements of knowledge represented as labeled rectangles connected by lines or arcs. Section 4.1, on pages 215–222, describes the application of fisheye views to SemNet, an example of which is shown and described in relation to FIG. 4-1. As described on page 218, tree distance is used to determine the degree-of-interest value for all the objects, including cluster objects that represent a set of elements. One drawback of this is that, when the viewpoint is moved, the objects that are displayed change abruptly between being a set of elements and a cluster object at invisible subdivision boundaries. This can be ameliorated by using euclidean distance to tell when a boundary is being approached, then highlighting the clusters that are about to change. Pages 220–221 describe how three-dimensional point perspective achieves a fisheye effect, with each object changing in size based on importance; the objects could also change in form, from an icon to smaller boxes and finally to a point. Section 5.2.4, on pages 227–228, describes hyperspace movement, in which the nodes connected to a selected knowledge element are temporarily moved to positions around it, and then snap back to their original positions after a new node is selected.

SUMMARY OF THE INVENTION

The present invention provides techniques for presenting a workspace with stretching to facilitate viewing. In response to a user request for stretching, the objects in the workspace are presented in a manner indicating that the workspace is stretched. The user can also request destretching, in which case the objects are again presented as if the workspace were not stretched.

One aspect of the invention is based on the recognition of problems with conventional techniques for presenting a more detailed view of a part of a workspace.

Some conventional techniques provide more detail by sacrificing the user's perception that the displayed features have relative positions, thereby sacrificing the perception of the workspace. In other words, the features shown at greater detail and the features shown at less detail are presented in such a way that the user has difficulty perceiving them as being positioned in relation to each other in a workspace. For example, the less detailed features may be presented as abstracted objects that appear to be outside the space in which the more detailed features appear.

Other conventional techniques such as magnifying or zooming, provide greater detail be temporarily changing the scale at which part of the workspace is presented. But changing the scale of a part of the workspace can confuse the user by eliminating cues about context: If a part of the workspace is presented at increased scale, the surrounding area may no longer be presented because of insufficient display area; or the surrounding area may have a discontinuous border with the increased scale part. These techniques therefore deprive the user of important cues about the relation between the increased scale part and the surrounding area.

This aspect of the invention is further based on the discovery that these problems can be solved by presenting the workspace as if part of it were distorted, such as by stretching. The user can then view the stretched part of the workspace in greater detail without losing the perception of its position relative to the surrounding area. For example, if a number of objects are presented on the workspace, stretching reduces the density of the objects in the stretched area and therefore assists the user in locating an object of interest. The objects themselves need not be modified in scale or shape. If the objects are, however, modified in scale or shape, they can be presented with additional internal detail, and previously invisible objects can become visible at a larger scale or an extended shape.

A closely related aspect of the invention is based on the recognition that when one part of the workspace is stretched, other parts must be compressed or otherwise modified to accommodate the stretching. This problem can be solved by presenting the workspace divided into panels or sections—when part of the workspace in one section stretches, other sections are modified to accommodate the stretching.

For example, the workspace can be presented as a series of three panels or sections, each of which is a two-dimensional surface. The middle section, presented as parallel to the display screen surface, can be stretched as requested by the user. Each peripheral section can be presented as extending away from the user at an angle from an edge of the middle section, so that each peripheral section occupies relatively little screen space. When the middle section stretches, objects on each peripheral section can be moved away from the user, in effect compressing each peripheral section to accommodate the stretching. On a large display, this technique makes good use of human peripheral vision.

Another closely related aspect of the invention is based on the recognition of a problem in moving objects across the edge between the middle section and one of the peripheral sections. Object constancy may be lost if an object is inappropriately presented as it crosses the edge during stretching. This problem can be solved by performing the stretching operation in steps that are small enough that object constancy is preserved.

The following description, the drawings and the claims further set forth these and other objects, features, and advantages of the invention.

DETAILED DESCRIPTION

A. Conceptual Framework

Figure 1A:
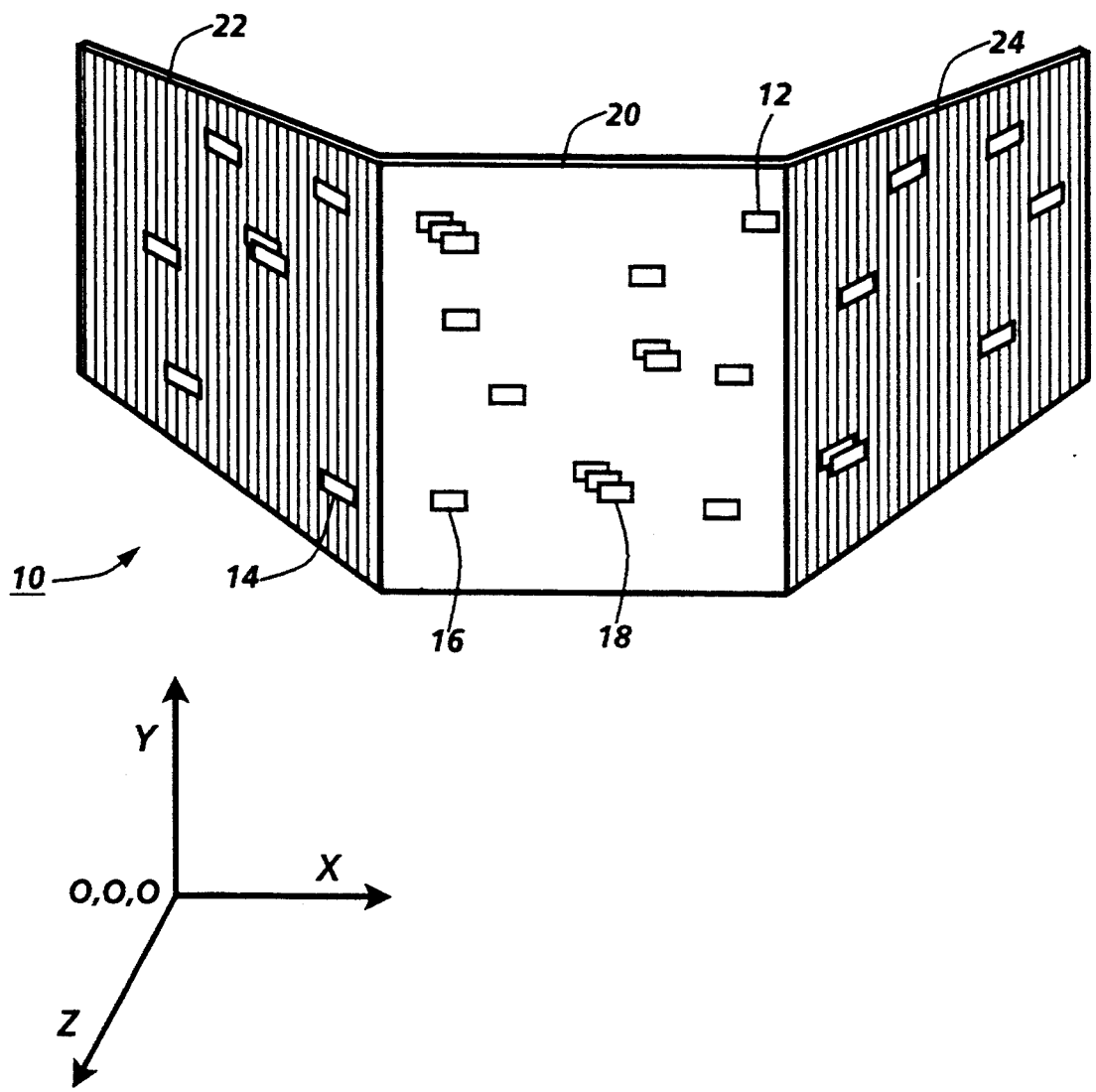
FIGS. 1A and 1B are views of workspaces, each of which has three sections, with the workspace of FIG. 1B perceptible as a stretched continuation of the workspace of FIG. 1A according to the invention.

The following conceptual framework is helpful in understanding the broad scope of the invention, and the terms defined below have the meanings indicated throughout this application, including the claims. This conceptual framework is a modification and extension of those set forth in the following copending, coassigned U.S. patent applications, which are incorporated herein by reference: U.S. patent application Ser. No. 07/030,766, issued as U.S. Pat. No. 5,072,412, entitled "User Interface with Multiple Workspaces for Sharing Display System Objects"; U.S. patent application Ser. No. 07/241,525, issued as U.S. Pat. No. 5,107,443, entitled "Private Regions Within a Shared Workspace"; and U.S. patent application Ser. No. 07/459,010, continued as application Ser. No. 07/795,238 which is in turn continued as application Ser. No. 08/066,311, entitled "Display of Hierarchical Three-Dimensional Structures with Rotating Substructures."

A "data processing system" is a system that processes data. A "data processor" or "processor" is any component or system that can process data, and may include one or more central processing units or other processing components. A "user input device" is a device such as a keyboard or a mouse that can provide signals based on actions of a user. An "image output device" is a device that can provide an image as output. A "display" is an image output device that provides information in visible form, such as on the screen of a cathode ray tube. The visible pattern presented by a display is an "image."

A wide variety of display techniques for data processing systems are available including, for example, various graphical user interfaces, but, despite their diversity, these techniques tend to have certain common characteristics. One fundamental common characteristic is that a display produces human perceptions. In this application, the term "display feature" refers to any human perception produced by a display.

A "workspace" is a display feature within which other display features appear to have positions relative to each other. In other words, a workspace is presented when the perception is produced that the other display features have relative positions. The workspace is the perceived space within which the relative positions exist. A workspace can have visible boundaries on the display, but not all workspaces have visible boundaries.

The present invention is particularly applicable to workspaces that include one or more sections, each of which is perceptible as a "surface," meaning a two-dimensional locus of points in three-dimensional space, the locus having a height z above each point of a contiguous region of a coordinate plane that is specified by a function f(x,y) that is continuous over the region. For a "two-dimensional surface," f(x,y)=Z, a constant, over the region, so that a surface that is perceived as a contiguous part of a plane is a two-dimensional surface.

Display features such as sections of a workspace are "perceptible in three-dimensions" when they are perceptible as having relative positions in a space that has three orthogonal dimensions. Typically, a display will have a two-dimensional display surface and the perception of the third dimension will be produced with visual cues such as obscuring of distant features by near features, size changes in features that change distance, and different shading of features at different distances. In effect, two-dimensional sections of a first workspace can be presented within a second workspace that is three-dimensional.

A second display feature is perceptible as a "continuation" of a first display feature when the presentation of the second display feature follows the presentation of the first display feature in such a way that the user perceives the first display feature as being continued when the second display feature is presented. This can occur, for example, when the successive display of two display features is so close in time and space that they appear to be the same display feature. This perception may be accompanied by the perception that the first display feature has moved. An example of this is the phenomenon called "object constancy."

If a second workspace is perceptible as a continuation of a first workspace, it may also be perceptible as a "modified continuation" if presentation of the second workspace produces the perception that the first workspace has been modified. More specifically, if a second workspace is perceptible as a modified continuation of a first workspace, it may also be perceptible as a "distorted continuation" if presentation of the second workspace produces the perception that the first workspace has been distorted, resulting in a non-uniform change in the relative positions of display features within it. Further, a part of the second workspace is perceptible as a "stretched continuation" of a part of the first workspace if it produces the perception that the part of the first workspace has been stretched. The second workspace is perceptible as a "stretched continuation" of a first workspace if it includes a part that is a stretched continuation of part of the first workspace and if its other parts have been modified to accommodate the stretching. On the other hand, a second workspace may be a modified continuation of a first workspace without being distorted, such as when the first workspace is increased or decreased in size, either through a magnification or demagnification or by increasing or decreasing its extent.

A "display object" is a display feature that has perceptible extent and that is coherent in the sense that it is perceived as a continuing bounded unity. Familiar examples of display objects include characters, icons, and windows. A display object within a workspace may not be modified when the workspace is distorted, in which case it may be perceived as being "tacked" to the workspace at a point. On the other hand, if the display object is distorted with the workspace, it may be perceived as being "glued" to the workspace over its entire extent.

A "data structure" is a combination of interrelated items of data. A processor "accesses" a data structure by any operation that retrieves or modifies data included in the data structure, such as by reading or writing data at a location in memory that is included in the data structure. A processor can be "connected for accessing" a data structure by any combination of connections with local or remote memory or input/output devices that permits the processor to access the data structure.

B. General Features

Figure 1B:
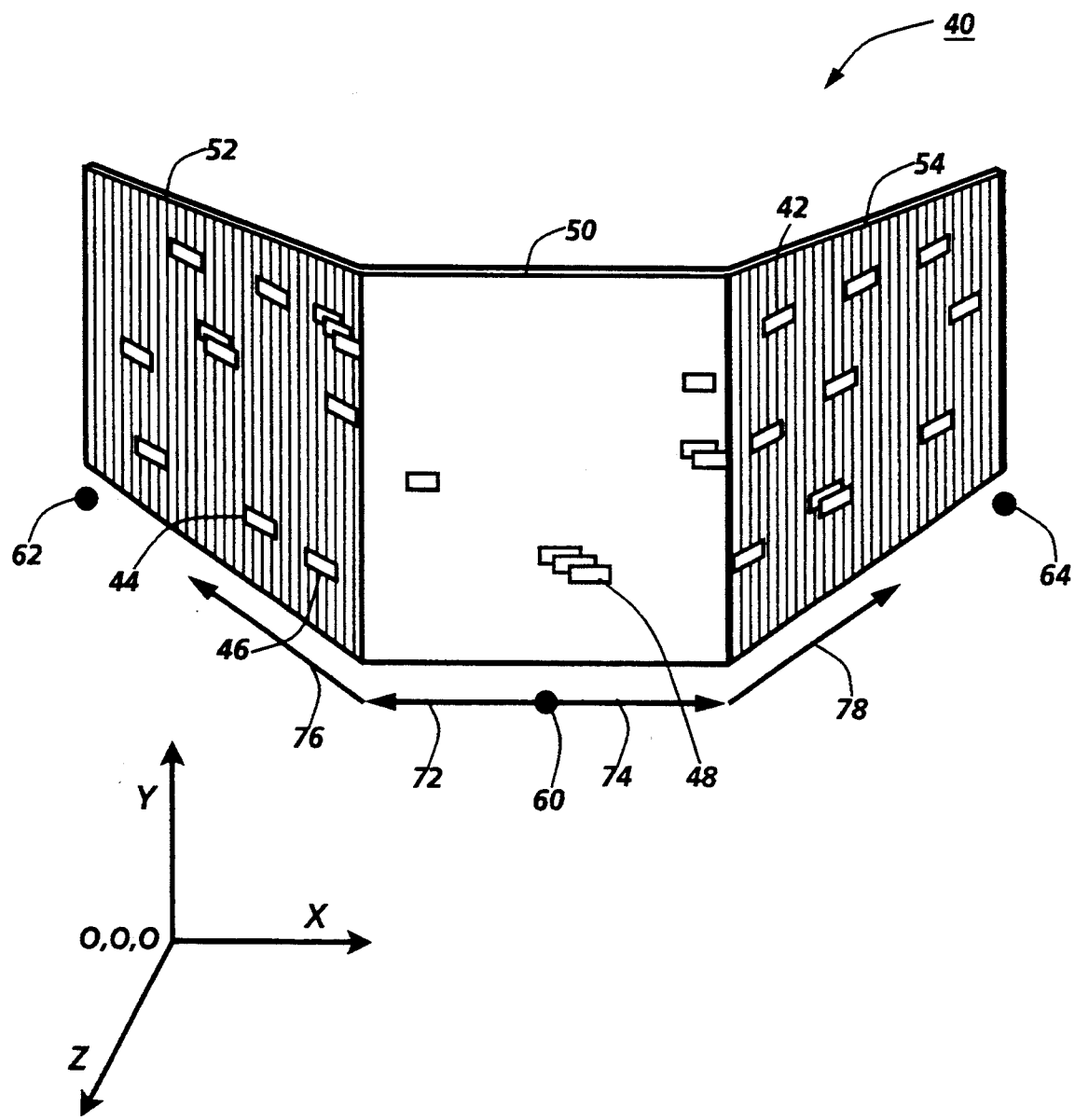
Figure 2A:
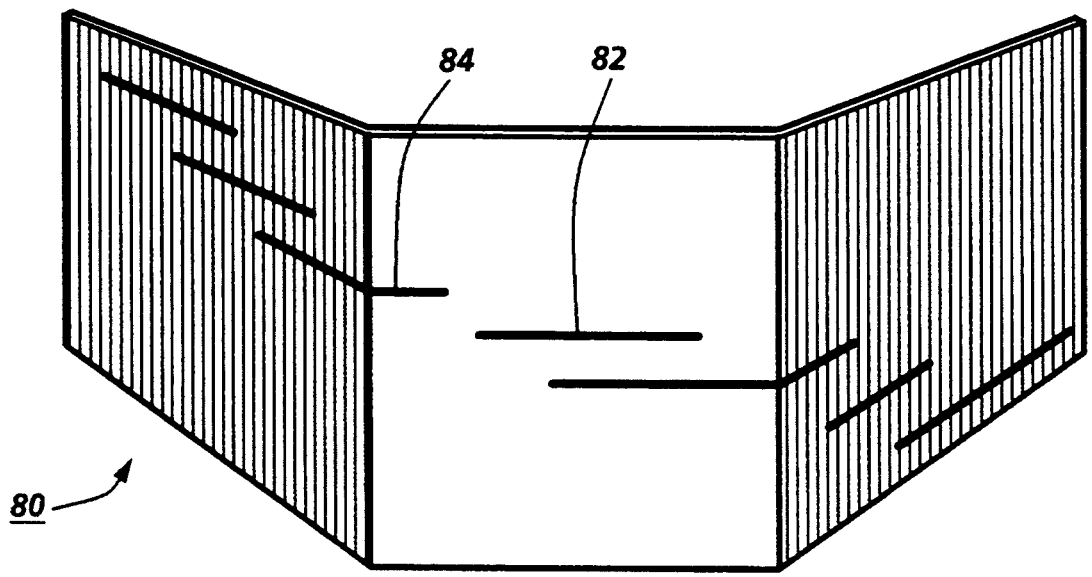
FIGS. 2A, 2B, and 2C are views of workspaces, each of which has three sections, with the workspaces of FIGS. 2B and 2C perceptible as stretched continuations of the workspace of FIG. 2A according to the invention.
Figure 2B:
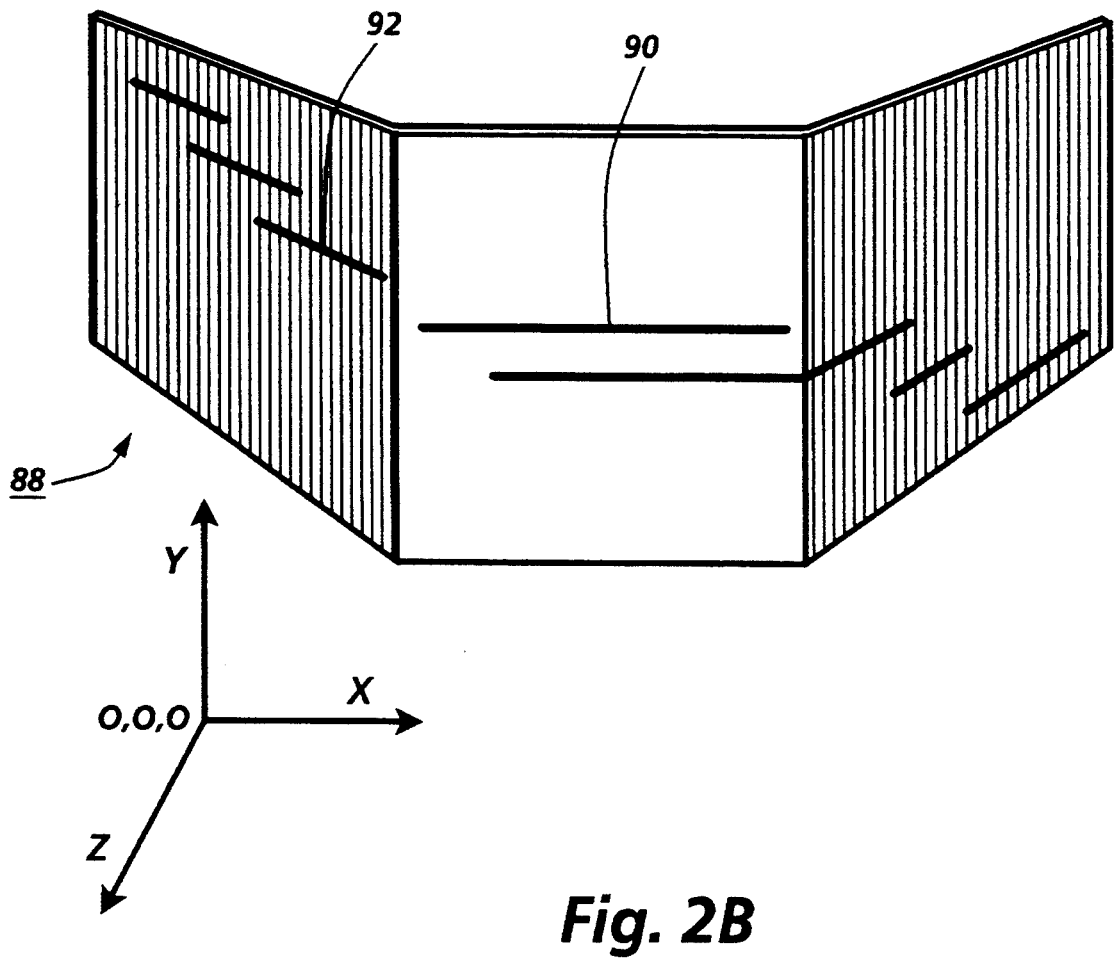
Figure 2C:
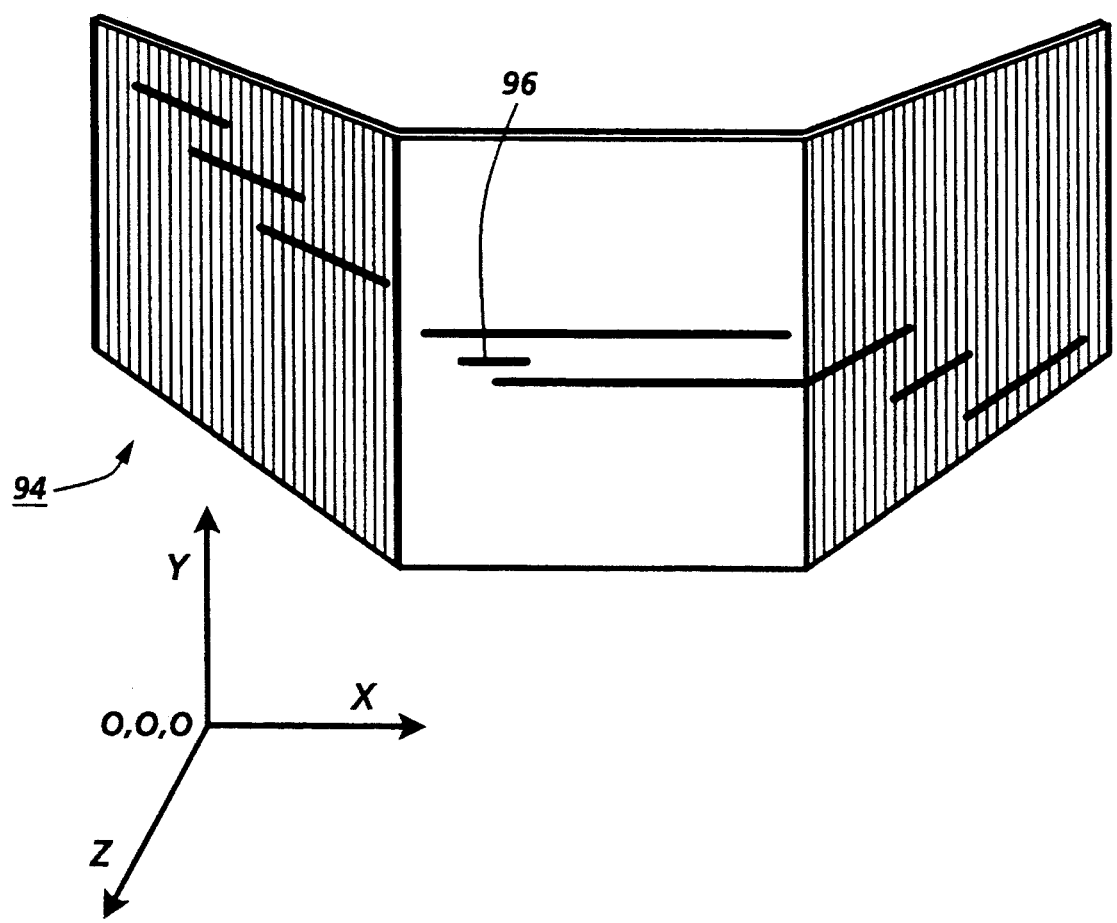
Figure 3:
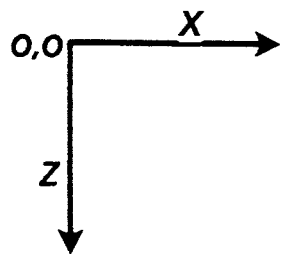
FIG. 3 is a plan view of a workspace like those in FIGS. 1A and 2A, showing regions.
Figure 3:
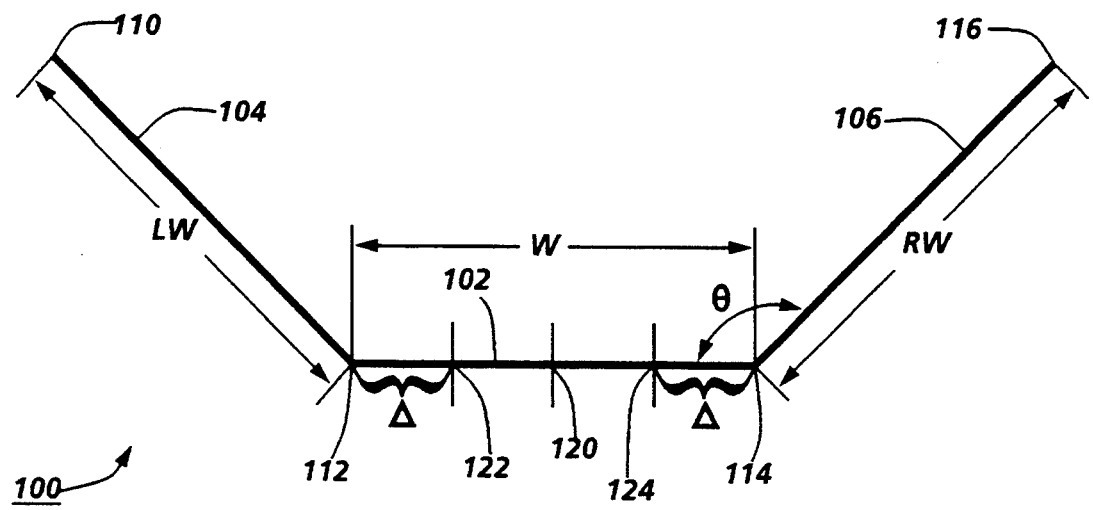

FIGS. 1A–3 illustrate general features of the invention. FIGS. 1A and 1B each show a workspace with three sections, the workspace of FIG. 1B being perceptible as a stretched continuation of the workspace of FIG. 1A. FIGS. 2A, 2B, and 2C each show a workspace with three sections, the workspaces of FIGS. 2B and 2C being perceptible as stretched continuations of the workspace of FIG. 2A. FIG. 3 shows how a workspace like those in FIGS. 1A and 2A can be divided into regions.

Workspace 10 in FIG. 1A includes a number of nodes including nodes 12, 14, 16, and 18, each shown as a card-like display object that has a four-sided geometric shape. These nodes are perceptible as having positions relative to each other, giving rise to the perception of workspace 10 as a space within which the nodes have relative positions. The positions of the nodes differ in two dimensions, which can be treated as x and y coordinates. For example, the x coordinate could be indicate linear differences in time and the y coordinate could indicate difference in nature or quality of nodes. Where more than one node is at the same coordinates, the coordinates can be offset to make all of the nodes visible, even though the upper nodes obscure parts of the lower nodes.

A number of static cues contribute to the perception that the nodes have relative positions in a space: The shading of the nodes and the background on which they are shown is such that the nodes appear to be on or in front of the background; some of the nodes, such as node 18, obscure parts of other nodes, suggesting that they are on or in front of the other nodes; and workspace 10 includes three sections, middle section 20 and peripheral sections 22 and 24. Peripheral sections 22 and 24 are perceptible as connected to the left and right edges of middle section 20 and as extending at an angle away from the observer so that nodes in peripheral sections 22 and 24 are in workspace 10 with nodes in middle section 20.

In addition, other cues can contribute to the perception that the nodes have relative positions in space: In response to a request from a user, a modified continuation of workspace 10 can be presented in which one or more nodes have moved to different positions or have moved across one of the edges from one section to another, while the relative positions of the nodes are unchanged. Also, a user may perceive the nodes as having relative positions in space based on past experience with similar images.

Workspace 10 is also perceptible as being in a three-dimensional workspace. the cues that contribute to this perception include the difference in shading between middle section 20 and peripheral sections 22 and 24; the difference in shape of the nodes in middle section 20 and peripheral sections 22 and 24; and the tapered shapes of peripheral sections 22 and 24, which suggest that they extend, in a three-dimensional workspace, away from the user viewing workspace 10.

Workspace 40 in FIG. 1B can be perceived as a stretched continuation of workspace 10 if presented appropriately. For example, if workspace 40 is presented immediately after workspace 10, the user may perceive it as a stretched continuation. Or a sequence of images can be presented beginning with workspace 10 and continuing with several workspaces, each of which appears to be a stretched continuation of workspace 10, including workspace 40.

If workspace 40 is perceived as a stretched continuation of workspace 10, then nodes 42, 44, 46, and 48 are perceived as continuations of nodes 12, 14, 16, and 18, respectively. Similarly, middle section 50 is perceived as a continuation of middle section 20, and peripheral sections 52 and 54 are perceived as continuations of peripheral sections 22 and 24, respectively.

Workspace 40 is perceptible as having been stretched in both directions from fixed point 60 at the center of middle section 50, as indicated by arrows 72 and 74. Fixed points 62 and 64 at the outer ends of peripheral sections 52 and 54 and arrows 76 and 78 indicate that peripheral sections 52 and 54 are perceptible as having been compressed to accommodate the stretching of middle section 50. As result of the stretching, nodes 42 and 46 are perceptible as having crossed the edges onto peripheral sections 52 and 54, respectively, while the nodes under node 48 are less obscured than the nodes under node 18 in workspace 10, making more internal detail visible.

Nodes in workspace 40 are perceptible as being tacked to a point in workspace 40 rather than being glued to workspace 40. As shown, the nodes themselves are not stretched, but each is shown as if its upper left hand corner were tacked to a position in workspace 40, with the position being displaced during stretching.

In contrast, nodes in the workspaces in FIGS. 2A, 2B, and 2C are bar-like display objects that are perceptible as being glued in place, so that they stretch and destretch with the workspaces. Workspace 80 in FIG. 2A includes nodes 82 and 84, for example, while workspace 88 includes nodes 90 and 92 that are perceptible as continuations of nodes 82 and 84, respectively. As can be seen, node 90 is a stretched continuation of node 82, allowing for presentation of additional internal detail. Node 92, however, is a compressed continuation of node 84.

Workspace 94 in FIG. 2C is like workspace 88 except that it also includes node 96, a node that was invisible in workspace 80 but that has become visible due to the change in size and shape resulting from stretching. This is another way in which stretching may make additional details visible to the user.

The choice between nodes that are tacked and nodes that are glued depends on the nature of the presentation being made. Gluing is likely to be more appropriate for presentations that involve a time scale or dependency, such as Gantt Charts, Pert Charts and the like. Gluing may also be appropriate for certain bar charts, pie charts, and other presentations with a strong geometrical component.

FIG. 3 illustrates how a workspace can be divided into regions for purposes of positioning nodes or other display features in the workspace during stretching. Workspace 100, like workspaces 10 and 80, includes middle section 102 and peripheral sections 104 and 106, seen in profile as if viewed from above in a three-dimensional workspace within which workspace 100 is positioned.

Workspace 110 thus extends from left end 110 of peripheral section 104 to edge 112 between peripheral section 104 and middle section 102, thence to edge 114 between middle section 102 and peripheral section 106, and thence to right end 116 of peripheral section 106. One of the cues that produces the perception of a three-dimensional workspace is that peripheral sections 104 and 106 are presented as if they meet middle section 102 at angles, with the angle $\theta$ at edge 114 being shown as approximately 135 degrees. In this perceived three-dimensional workspace, peripheral section 104 has a width of LW, central section 102 has a width of W, and peripheral section 106 has a width of RW. LW, W, and RW can be held constant during stretching, as in the implementation discussed below, or could be adjusted in an appropriate way.

Middle section 102, as shown, has a center point 120, and is divided at points 122 and 124 into a central region and two side regions. The points 122 and 124 are positioned at a distance $\Delta$ from the edges 112 and 114, respectively, so that the width of each side region is $\Delta$ and the width of the central region is $W-2\Delta$. The side regions are, in effect, moved from middle section 102 to peripheral sections 104 and 106 during stretching. In other words, the central region of middle section 102 is stretched until it fills the area of middle section 102, while each side region and the adjacent peripheral section are compressed until they fit into the area of the peripheral section.

To perform a sequence of steps of stretching or destretching, the width of each side region, $\Delta$, can vary in steps between $\Delta=0$ when the workspace is unstretched and $\Delta=W/2.5$ when the workspace is fully stretched. The steps between values of $\Delta$ are sufficiently small that the sequence of steps of stretching or destretching produces the perception of smooth movement of display features across the edges between sections, preserving the object constancy of display objects.

C. Implementation

The general features described in relation to FIGS. 1A-3 could be implemented in many ways on a wide variety of data processing systems. FIGS. 4–8 illustrate features of a current implementation, which runs on a Silicon Graphics workstation. This implementation is called the Perspective Wall, and the Perspective Wall has three sections, called panels. The Perspective Wall has been implemented for a Unix file browser: The horizontal axis represents time, specifically the last modification time for each file. The vertical axis represents file type, such as Lisp, C, Object, PDL, backups, or other. The nodes are files, and a rectangular card-like display object for each node is positioned on the wall surface according to its time and file type. If multiple nodes have the same time and file type, they are overlapped as if stacked vertically. Color depth cues are used on the side panels to enhance the perception of three dimensions. Similarly, the visual cues are provided so that the user perceives a floor plane supporting the Perspective Wall, further enhancing the perception of three dimensions.

1. Presentation

Figure 4:
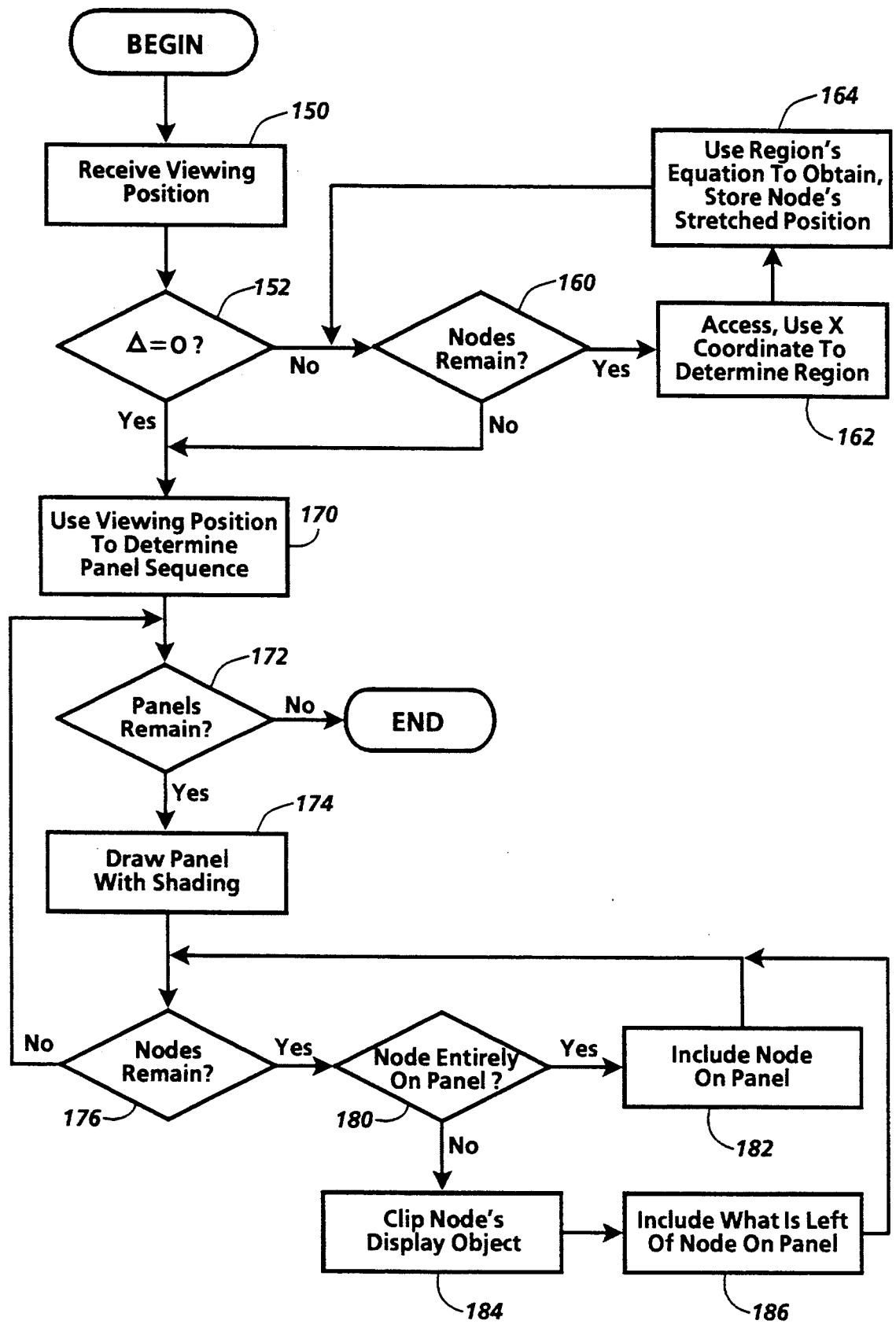
FIG. 4 is a flow chart showing general steps in presenting workspaces like those in FIGS. 1A and 1B.

FIG. 4 shows general steps in presenting the Perspective Wall. In the step in box 150, the current viewing position is received; this step can also include receiving any other data needed to perform the steps in FIG. 4, such as a handle for the data structure that includes data for each of the nodes presented on the Perspective Wall. This data structure can include, for each node, a unique identifier (UID); a position on the unstretched Perspective Wall expressed in x and y coordinates; a position on the stretched Perspective Wall expressed as an x coordinate; and a text that can, for example, be represented in the node's display object.

The step in box 152 in FIG. 4 tests whether a stored value $\Delta$ is equal to zero. If not, the Perspective Wall is stretched, so that the step in box 160 begins an iterative loop that goes through the nodes, determining the position of each node on the stretched Perspective Wall. The data for each node can be accessed in the data structure using the nodes UID, which can for example be numbers, so that the nodes are accessed in the iterative loop in the order of their UIDs.

The step in box 162 accesses and used the x coordinate on the unstretched Perspective Wall of the node being handled to determined which of the regions shown in FIG. 3 includes it. The step in box 164 then applies the appropriate equation for that region to obtain the x coordinate on the stretched Perspective Wall, which could then be stored in the data structure for subsequent use.

Equations that can be applied in box 164 are as follows, where x indicates the unstretched position, x' indicates the stretched position, and LW, W, RW, and $\Delta$ indicate the widths discussed in relation to FIG. 3: (a) For a node on the panel corresponding to peripheral section 104 or for a node on the left side region of the panel corresponding to middle section 102 in FIG. 3, i.e. $0 < x < LW + \Delta$: $x'_a = x_a - \Delta(x_a/(LW + \Delta))$, a where $x_a = x$ and $x_a' = x'$. (b) For a node on the central region of the panel corresponding to middle section 102 in FIG. 3, i.e. $LW + \Delta \leq x < LW + W - \Delta$: $x'_b = x_b - \Delta((W/2 - x_b)/(W/2 - \Delta))$, where $x_b = x - LW$ and $x' = x_b' + LW$ so that $x_b < W/2$ on the left half of the central region and $x_b > W/2$ on the right half; it may also be necessary to apply this or another equation to nodes on the left and right side regions of middle section 102 so that clipping can be performed to eliminate nodes in the side regions. (c) For a node on the right side region of the panel corresponding to middle section 102 or on the panel corresponding to peripheral section 106 in FIG. 3, i.e. $LW + W - \Delta \leq x < LW + W + RW$; $x'_c = x_c + \Delta((RW - x_c)/(RW + \Delta))$, where $x_c = x - LW - W$ and $x' = x_c' + LW + W$.

Figure 5:
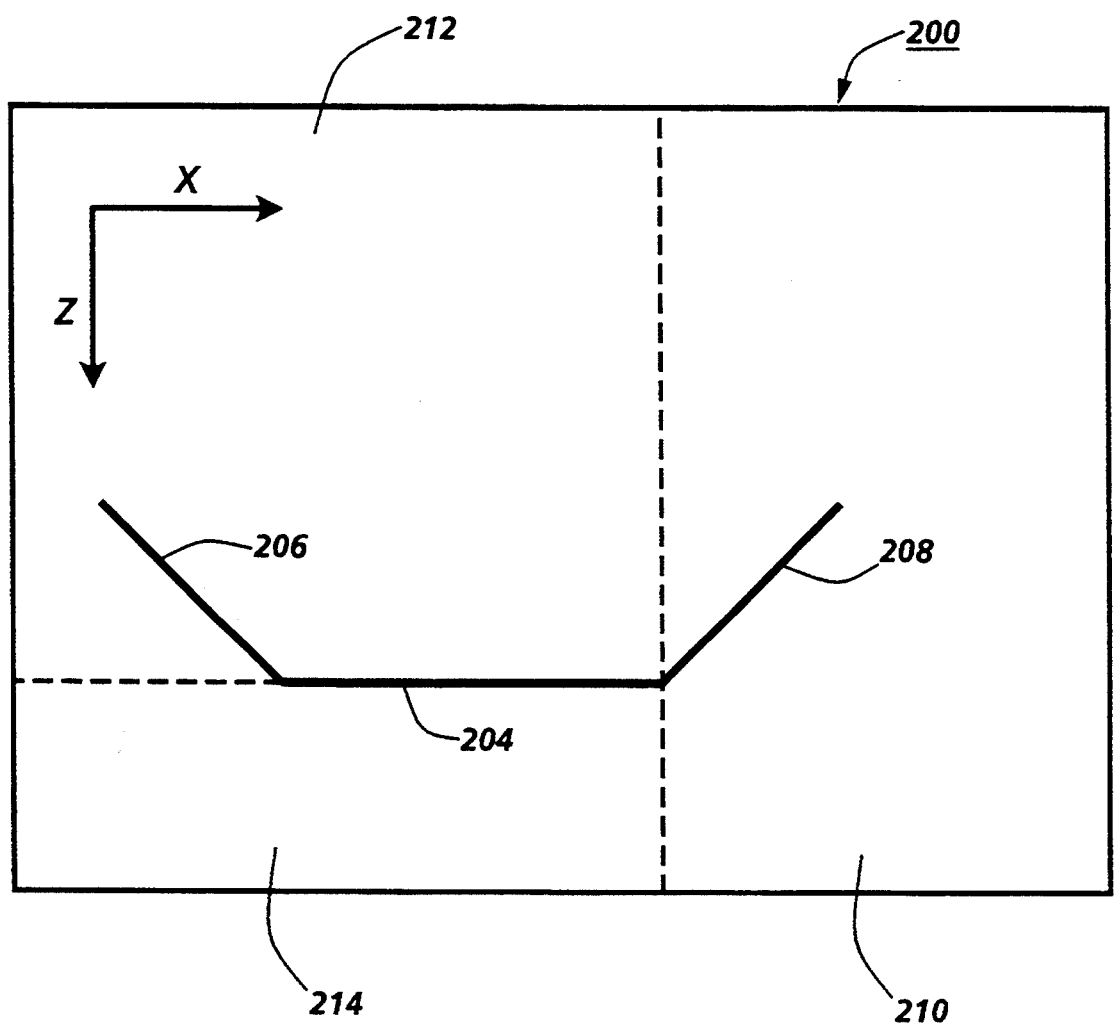
FIG. 5 is a plan view of a workspace like that in FIG. 3, illustrating how a viewing position within a three-dimensional space can be used to determine the sequence in which the panels are drawn.

When all the nodes have been handled in this manner, the step in box 170 uses the viewing position received in box 150 to determine the sequence in which the panels of the Perspective Wall are drawn. FIG. 5 shows one way in which this sequence can be determined within three-dimensional workspace 200 that includes a Perspective Wall with middle panel 204 and side panels 206 and 208: A viewing position is in region 210 if its x coordinate in workspace 200 is greater than that of the edge between middle panel 204 and right side panel 208; for viewing positions in region 210, left side panel 206 is draw first, followed by middle panel 204 and right side panel 208. A viewing position is in region 212 if its x coordinate is less than that of the edge between middle panel 204 and right side panel 208 but its z coordinate is less than that of middle panel 204; for viewing positions in region 212; middle panel 204 is drawn first, followed by right side panel 208 and left side panel 206. A viewing position is in region 214 if its x coordinate is less than that of the edge between middle panel 204 and right side panel 208 but its z coordinate is greater than that of middle panel 204; for viewing positions in region 214, right side panel 208 is drawn first, followed by left side panel 206 and middle panel 204.

The technique of FIG. 5 for determining the order in which the panels are drawn may be advantageous in some implementations because it avoids the need for Z-buffer hardware. Also, the nodes' display objects can be presented so that they are visible from either side of the panels, but if Z-buffer hardware is available, each node could instead be positioned just in front of its panel so that it would only be visible from the front of the panel.

When the panel sequence has been determined, the step in box 172 begins an outer iterative loop that draws the panels in the determined sequence. The step in box 174 draws the next panel in the sequence, rotating it about the appropriate axis in the three-dimensional workspace 200 to provide the angle $\theta$ as discussed above in relation to FIG. 3. To facilitate the perception of three dimensions, Gouraud shading can be used to determine the shading of the panels in this step, with the panels being more darkly shaded as they are more distant from the viewing position.

The step in box 176 begins an inner iterative loop that, during the drawing of each panel, goes through the nodes again to find and handle the nodes in the panel being drawn. The test in box 180 determines, for the next node, whether its display object is entirely on the panel being drawn, which can be determined from the node's x coordinate and the length of its display object. The x coordinate in the unstretched Perspective Wall is used in box 180 if $\Delta = 0$; otherwise, the stretched x coordinate from box 166 is used.

If the node's display object is entirely on the panel being drawn, the step in box 182 includes the node on the panel. If the node's display object is not entirely on the panel being drawn, the step in box 184 clips the node's display object, cutting off the part that is not on the panel being drawn, which may be the entire display object. Then, in box 186, what is left of the display object after clipping, if anything, is included in the panel being drawn. Shading techniques could be applied to the node display objects.

2. Scrolling

Figure 6:
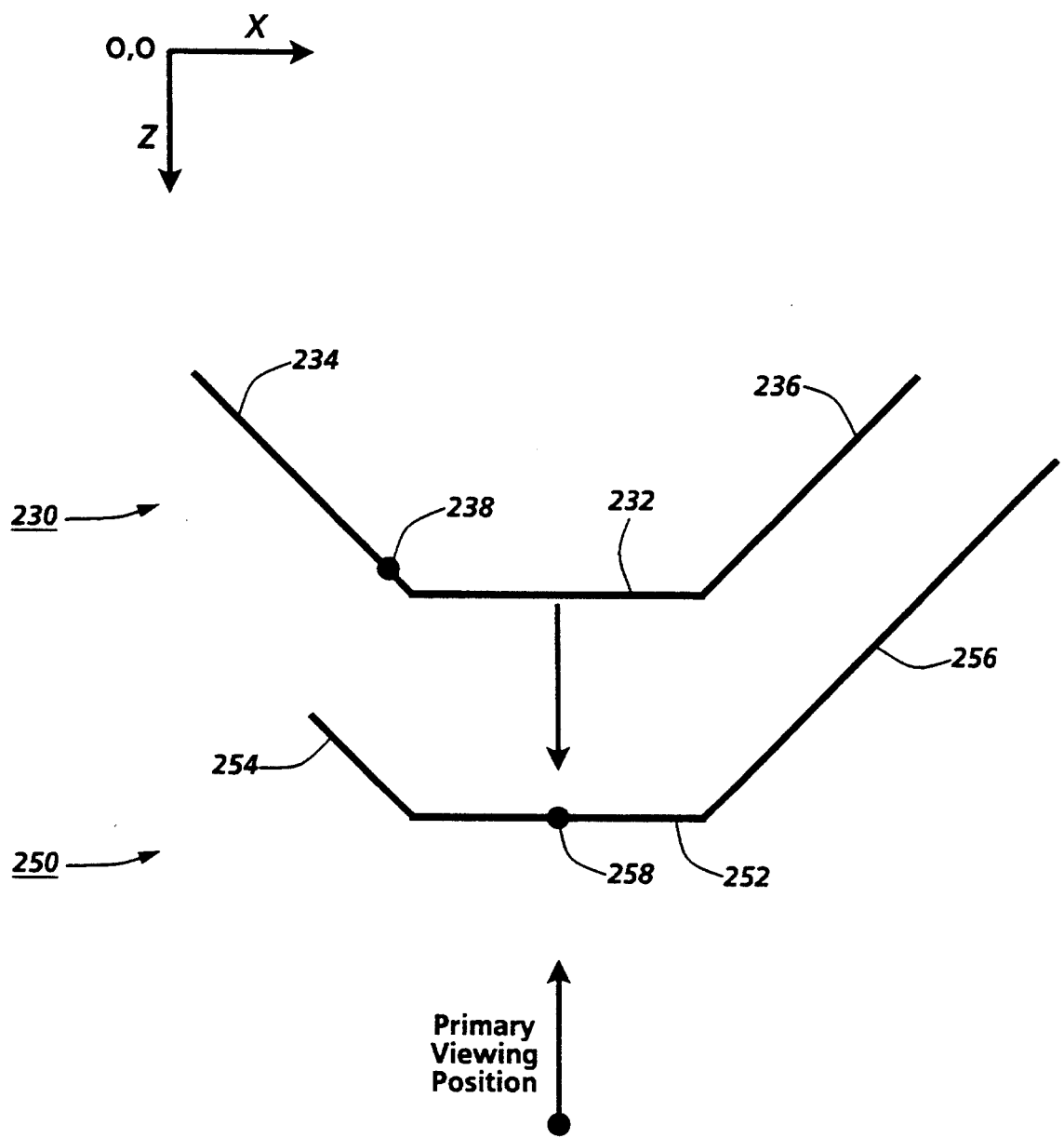
FIG. 6 is a sequence of two plan views of workspaces like those in FIG. 3, showing how scrolling can be performed.

When the Perspective Wall has been presented, the user can request a scrolling operation to bring a selected node to a primary viewing position at the center of the middle section of the Wall, as illustrated in FIG. 6. Each of the node display objects can be a selectable unit so that the user can request the scrolling operation simply by selecting a node's display object with a user input device such as a mouse. Picking hardware can be used to determine which display object has been selected.

FIG. 6 shows wall 230 with middle panel 232 and side panels 234 and 236. Side panels 234 and 236 are shown as being of approximately equal length.

Selected position 238 is positioned in the display object of a node on side panel 234, near the edge at which it meets middle panel 234.

In response to the user input signal selecting position 238, the display object of the selected node is highlighted in blue, those of related nodes such as other files in the same directory are presented in white, and display objects of other nodes are presented in grey. Text associated with the selected node and related nodes is also displayed in their display objects. Then, after a scrolling operation, wall 250 is presented with middle panel 252 and side panels 254 and 256. Because of the scrolling operation, side panels 254 and 256 are not of equal length, but side panel 254 has been shortened and side panel 256 has been lengthened as necessary to bring the selected position 258 (corresponding to position 238) to the center of middle panel 252, at which it is in the primary viewing position.

To maintain object constancy during selection scrolling, a sequence of walls can be presented between wall 230 and wall 250 using animation techniques. A governor is used to determine how many animation cycles are necessary to accomplish selection scrolling in a predetermined fixed time and to determine a step length by dividing the total distance from the selected position to the primary viewing position by the number of animation cycles. The distance from the selected position to the primary viewing position can be determined from the node's x coordinate on the wall and the lengths of the left side panel 234 and middle panel 232. Each animation cycle that occurs during the selection scrolling operation then moves the wall by the step length from the previous position.

Continuing scrolling can be provided in a manner similar to selection scrolling. The user could request continuing scrolling by depressing a mouse button when the pointer is indicating a location on the wall that is not in a node display object. If the indicated location on the wall is left of the center point, the wall scrolls to the right, and if the indicated location is right of the center point, the wall scrolls to the left. The length of each continuing scrolling step can depend on how far the indicated location is from the center point, with the step length being longer if the indicated location is farther from the center point. Continuing scrolling can terminate when one of the ends of the wall reaches the center point.

3. Animation

Figure 7:
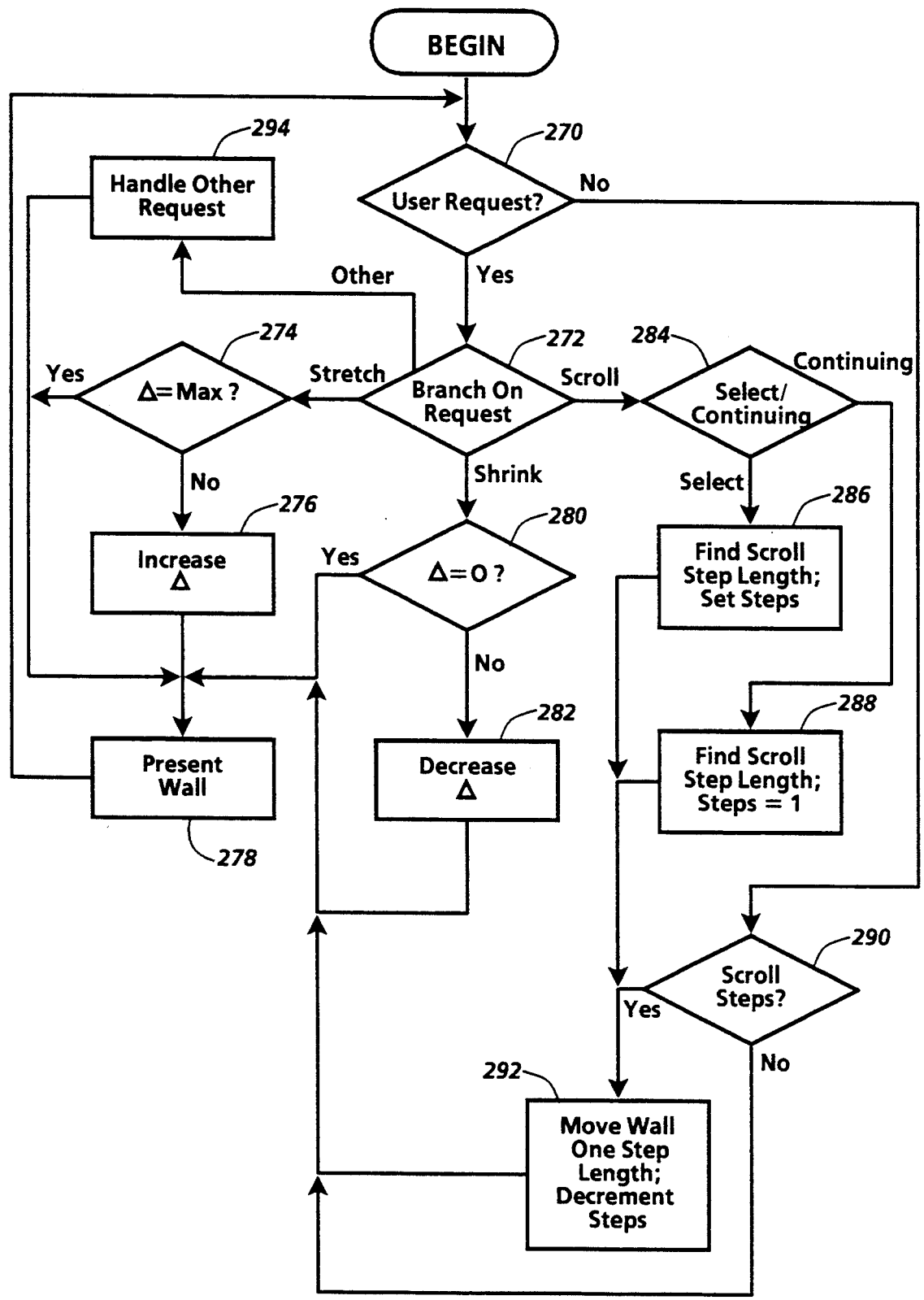
FIG. 7 is a flow chart showing steps in an animation loop that performs stretching, shrinking, and scrolling of workspaces like those in FIGS. 1A and 1B.

FIG. 7 shows steps in an animation loop that can perform stretching, shrinking, selection scrolling, and continuing scrolling. One reason for using animation for these operations is to shift some of the cognitive processing load to perceptual activity by making use of the object constancy property of the human perceptual system. In this way, large scale changes in the Perspective Wall can be made without the cognitive reassimilation that would be necessary without animation. Animation allows the perceptual system to follow the changes while they are being made, so that when the final form is displayed the user is already aware of what is being seen.

The step in box 270 determines whether a user request has been received from a user input device since the last animation loop. If so, the step in box 272 branches based on the user request.

If the user is depressing a key that requests a stretch operation, the step in box 274 tests whether the stored value Δ is already at the maximum value, which may be W/2 as discussed above. If not, Δ is increased by one incremental amount in box 276 before presenting the Wall again in box 278. If Δ has already reached its maximum value, no further stretching is possible, so the Wall is presented in box 278. Then, the loop begins again with the step in box 270, possibly after an appropriate delay so that animated steps are evenly timed.

If the user is depressing a key that requests a shrink operation, the step in box 280 tests whether the stored value Δ is already at the value zero. If so, no further shrinking is possible, and the Wall is presented in box 278. But if not, Δ is decreased by one incremental amount in box 282 before presenting the Wall in box 278.

The incremental amounts in boxes 286 and 292 should be sufficiently small that the animation steps produce the perception that the stretched or shrunken Wall is a continuation of the previously presented Wall and to preserve object constancy for node display objects.

If the user has requested scrolling, the step in box 284 branches based on whether a node display object was selected or not. If a node display object was selected, the step in box 286 finds the scroll step length and sets the necessary number of scroll steps as described above in relation to FIG. 6. Otherwise, continuing scrolling is requested, so that the step in box 288 determines a scroll step length as described above and sets the number of scroll steps to one.

If no user request was made, as determined in box 270, the test in box 290 determines whether any scroll steps remain to be made, which can occur if the step in box 286 sets a number of scroll steps greater than one. If so, or after one of the steps in boxes 286 and 288, the step in box 292 scrolls the Wall by moving it one step length by modifying the values LW and RW, discussed above in relation to FIG. 3. If LW is decreased and RW is increased, the Wall steps rightward, but if LW is increased and RW is decreased, the Wall steps leftward. The number of steps is also decremented in box 292. Then, the Wall is again presented in box 278.

If the user has made another request, the request is handled as appropriate in box 294 before presenting the Wall again in box 278. An example of another request is a request for a search operation. In response to a request for a search operation, a search is performed for nodes or files that match the search parameters, and only those nodes are displayed, providing a progress indicator of the search. Another example is a request for an operation setting up the Wall prior to its first presentation. In response to a wall setup request, initialization is performed so that the Wall is appropriately presented in box 278.

The implementation could use the animation techniques described in Robertson, G. G., Card, S. K., and Mackinlay, J. D., "The Cognitive Coprocessor Architecture for Interactive User Interfaces," *Proceedings of the ACM SIGGRAPH Symposium on User Interface Software and Technology*, Williamsburg, Va., Nov. 13–15, 1989, pp. 10–18, incorporated herein by reference.

4. The System

Figure 8:
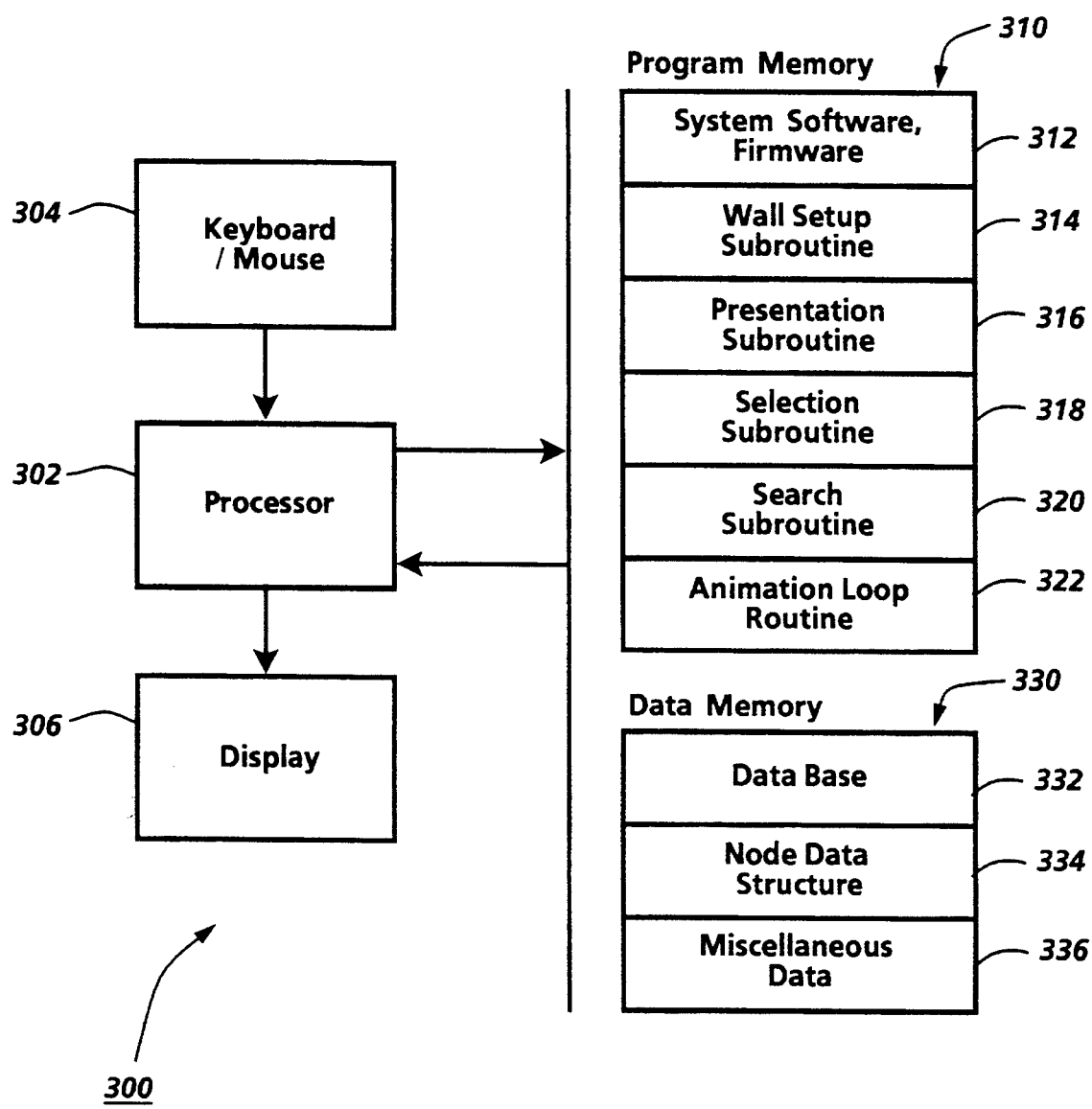
FIG. 8 is a block diagram showing components of a system that can perform the steps in FIG. 7.

FIG. 8 shows components of system 300 implementing the features described above. System 300 includes processor 302, which could be any processor, including one or more CPUs, and may include specialized hardware such as one or more coprocessors to provide specific functions. Processor 302 is connected for receiving signals based on user input actions from a user input device that includes keyboard and mouse 304, and is also connected for providing image data to an image output device that includes display 306. Processor 302 is also connected for accessing program memory 310 and data memory 330.

Program memory 310 includes instructions executed by processor 302 during its operation, including the following: Underlying system software and firmware 312 provide the operating system and other facilities of system 300. Wall setup subroutine 314 initializes values necessary for initial presentation of the Wall, as described in relation to FIG. 7. Presentation subroutine 316 presents the Perspective Wall, as described in relation to FIG. 4. Selection subroutine 318 is called to handle a user selection of a node on the Perspective Wall, and sets up a scrolling operation as described in relation to FIG. 6. Search subroutine 320 performs a search for nodes meeting specified parameters. Animation loop routine 322 is executed continuously, as described above in relation to FIG. 7, and makes calls to the subroutines described above when appropriate.

Data memory 330 includes data structures accessed by processor 302 during execution of instructions in program memory 310, including the following: Database 332 is an underlying data structure accessed by main wall routine 314, such as a set of Unix files. Node data structure 334 is produced by main wall routine 314, and includes a data item for each node that has a display object presented on the Wall; node data structure 334 is accessed by presentation subroutine 316 and other subroutines. Database 332 can thus have any form that admits of the production of a data structure of nodes relating to its contents. Miscellaneous data 336 includes initial values and other data used in executing instructions in program memory 310, and can include values of coordinates of one of the edges of the Wall in three-dimensional space, LW, W, RW, $\Delta$, $\theta$, the number of remaining scroll steps, the length of each scroll step, and the size of each incremental amount by which $\Delta$ is increased or decreased.

D. Miscellaneous

The invention has been described in relation to a workspace with a middle section and with peripheral sections on the left and right of the middle section, but the peripheral sections could be on the top and bottom of the middle section, and peripheral sections could be provided on all four sides of the middle section.

The invention has been described in relation to a workspace containing card-like display objects and bar-like display objects, but might also be applied to other workspaces, such as a workspace within which a document is presented, to provide greater detail about a part of the document's text, graphics, or other contents. The invention has been described in relation to a continuous workspace within which the card-like display objects and bar-like display objects could occupy any position, but might also be implemented for a workspace in which such display objects can occupy a number of discrete positions. The invention has also been described in terms of uniform stretching over a section of a wall, but the stretching need not be uniform. Furthermore, in the case of glued display objects, the invention has been described in terms of continuous expansion during stretching, but a discrete change in a display object could occur at a given degree of stretching, such as through cartographic scaling.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method of operating a processor connected for providing image data to an image output device that includes a display, the image output device presenting images on the display in response to the image data, the method comprising acts of:

providing first image data so that the image output device presents a first image, the first image including a first set of two or more display features that are perceptible as positioned relative to each other in a first workspace; and providing second image data so that the image output device presents a second image following the first image in sequence, the second image including a second set of two or more display features that are perceptible as continuations of the first set of display features, the second set of display features being perceptible as positioned relative to each other in a second workspace;

the first and second workspaces being perceptible as surfaces; each surface having first and second sections that meet at an angle along a first edge so that first and second sections are perceptible in three dimensions; the angle not being equal to 180 degrees; the first and second sections of the second workspace being perceptible as continuations respectively of the first and second sections of the first workspace;

the second workspace being perceptible as a stretched continuation of the first workspace; the second workspace including a stretched part in its first section that is perceptible as a stretched continuation of a part of the first workspace; the second workspace also including a part in its second section that accommodates stretching.

2. The method of claim 1 in which the first set of display features includes a first display object that is perceptible as positioned in the part of the first workspace and the second set of display features includes a second display object that is perceptible as a continuation of the first display object and as positioned in the stretched part of the second workspace, the second display object being the same size as the first display object.

3. The method of claim 1 in which the first set of display features includes a first display object that is perceptible as positioned in the part of the first workspace and the second set of display features includes a second display object that is perceptible as a stretched continuation of the first display object and as positioned in the stretched part of the second workspace.

4. The method of claim 3 in which the second display object includes internal detail not included in the first display object.

5. The method of claim 3 in which the second set of display features includes a new display object that is not perceptible as a continuation of any of the first set of display features, the new display object being perceptible as positioned in the stretched part of the second workspace.

6. The method of claim 1 in which the first set of display features includes a first display feature that is perceptible as positioned in the first section of the first workspace and the second set of display features includes a second display feature that is perceptible as positioned in the second section of the second workspace, the second display feature being perceptible as a continuation of the first display feature through movement of the first display feature from the first section across the first edge to the second section.

7. The method of claim 6 in which the first and second display features are display objects.

8. The method of claim 1 in which the first and second workspaces each further include respective third sections that meet the respective first sections along a respective second edge, the third section and second edge of the second workspace being perceptible as continuations respectively of the third section and second edge of the first workspace; the third section of the second workspace being perceptible as modified from the third section of the first workspace to accommodate stretching of the streched part.

9. The method of claim 1 in which the display has a screen surface viewed by a user, the first and second sections in each of the first and second workspaces being perceptible as two-dimensional surfaces with the first section of each of the first and second workspaces being in a plane substantially parallel to the screen surface and the second section of each of the first and second workspaces extending from the first edge in a direction away from the user.

10. The method of claim 9 in which the angle is approximately 135 degrees so that the second section of each of the first and second workspaces occupies relatively little of the screen surface.

11. The method of claim 1 in which the first set of display features includes a first display object and the second set of display features includes a second display object, the second display object being perceptible as a continuation of the first display object through movement of the first display object.

12. A method of operating a processor connected for providing image data to an image output device that includes a display, the image output device presenting images on the display in response to the image data, the method comprising two or more acts performed in sequence, each act comprising:

providing image data so that the image output device presents an image, each image including a set of two or more display features that are perceptible as positioned relative to each other in a workspace;

the sequence of acts including a preceding act and a following act that follows the preceding act in the sequence; the set of display features of the following act being perceptible as continuations of the set of display features of the preceding act;

the respective workspaces of the preceding and following acts being perceptible as surfaces; each surface having first and second sections that meet at an angle along a first edge so that first and second sections are perceptible in three dimensions; the angle not being equal to 180 degrees; the first and second sections of the following act being perceptible as continuations respectively of the first and second sections of the preceding act;

the first section of the following act including a stretched part that is perceptible as a stretched continuation of a part of the first section of the preceding act; the second section of the following act also including a part that accommodates stretching.

13. The method of claim 12 in which the processor is further connected for receiving signals from a user input device, the sequence of acts including a first act; the method further comprising receiving signals from the user input device requesting presentation of an increasingly stretched version of the workspace of the first act; the respective workspaces of the preceding and following acts being perceptible as increasingly stretched continuations of the workspace of the first act in a sequence of stretched continuations leading from the workspace of the first act to the workspace of the preceding act and thence to the workspace of the following act.

14. The method of claim 12 in which the set of display features of the preceding act includes a first display feature that is perceptible as positioned in the first section of the workspace of the preceding act and the set of display features of the following act includes a second display feature that is perceptible as positioned in the second section of the workspace of the following act, the second display feature being perceptible as a continuation of the first display feature through movement of the first display feature from the first section across the first edge to the second section.

15. A system comprising:
an image output device that includes a display; and
a processor connected for providing image data to the image output device; the image output device presenting images on the display in response to the image data;

the processor operating to provide the image data so that the image output device presents a sequence of images, each image including a set of two or more display features that are perceptible as positioned relative to each other in a workspace;

the sequence of images including a preceding image and a following image that follows the preceding image in the sequence; the set of display features of the following image being perceptible as continuations of the set of display features of the preceding image;

the workspaces of the preceding and following images being perceptible as surfaces; each surface having first and second sections that meet at an angle along a first edge so that first and second sections are perceptible in three dimensions; the angle not being equal to 180 degrees; the first and second sections of the following image being perceptible as continuations respectively of the first and second of the preceding image;

the first section of the following image including a stretched part that is perceptible as a stretched continuation of a part of the first section of the preceding image; the second section of the following image also including a part that accommodates stretching.

16. The system of claim 15, further comprising a user input device, the processor further being connected for receiving signals from the user input device; the sequence of images including a first image; the processor further operating to receive signals from the user input device requesting presentation of increasingly stretched versions of the workspace of the first image; the respective workspaces of the preceding and following images being perceptible as increasingly stretched continuations of the workspace of the first image in a sequence of stretched continuations leading from the workspace of the first image to the workspace of the preceding image and thence to the workspace of the following image.

17. The system of claim 15 in which the set of display features of each of the images includes a set of display objects, the system further comprising a data structure that includes a set of two or more items, each item including data for a respective one of the set of display objects in each of the images; the processor further being connected for accessing the data structure in providing the image data.

18. A method of operating a processor connected for providing image data to an image output device that includes a display, the image output device presenting images on the display in response to the image data, the method comprising:

provㅤiding first image data so that the image output device presents a first image, the first image including a first set of two or more display objects that are perceptible as positioned relative to each other in a first workspace; each of the first set of display objects having extent and being bounded; and providing second image data so that the image output device presents a second image following the first image in sequence, the second image including a second set of display objects that are perceptible as continuations of the first set of display objects, the second set of display objects being perceptible as positioned relative to each other in a second workspace; each of the second set of display objects having extent and being bounded;

the first and second workspaces being perceptible as surfaces, each surface having first and second sections that meet at an angle along a respective first edge so that the first and second sections are perceptible in three dimensions; the angle not being equal to 180 degrees; the first section, second section, and first edge of the second workspace being perceptible as continuations respectively of the first section, second section, and first edge of the first workspace;

the second workspace being perceptible as a stretched continuation of the first workspace; the second workspace including a stretched part in its first section that is perceptible as a stretched continuation of a part of the first workspace; the second workspace also including a part in its second section that accommodates stretching of the stretching part in its first section.

19. The method of claim 18 in which each display object in the first and second set of display objects is card-like.

20. The method of claim 19 in which each display object has four sides.

21. The method of claim 18 in which each display object in the first and second set of display objects is bar-like.

22. The method of claim 18 in which the angle is approximately 135 degrees.

* * * * *